Oct. 22, 1968   J. S. AXELSON ET AL   3,407,110
HEAT SHIELD
Filed Nov. 25, 1964

INVENTORS.
JOHN S. AXELSON
CALVIN M. DOLAN
BY
ATTORNEY

United States Patent Office 3,407,110
Patented Oct. 22, 1968

3,407,110
HEAT SHIELD
John S. Axelson, Levittown, and Calvin M. Dolan, King of Prussia, Pa., assignors to General Electric Company, a corporation of New York
Filed Nov. 25, 1964, Ser. No. 413,901
7 Claims. (Cl. 161—68)

ABSTRACT OF THE DISCLOSURE

A flexible ablating heat shield, comprising a discontinuous, heat-resistant, honeycomb matrix filled with a flexible ablation material, is produced by (1) making cuts in at least two of the cell walls of each of the honeycomb cells of the honeycomb sheet to a depth less than the thickness of the honeycomb cells but greater than the thickness of the desired heat shield, (2) filling the cells of the honeycomb with a flexible ablation material, such as an elastomeric silicone, and (3) slicing the filled honeycomb perpendicular to the cell walls to remove that layer of the honeycomb not cut in step (1) above.

This invention relates to improved ablation type heat shields and the method of fabricating them.

Vehicles moving at high velocities through the atmosphere of the earth or another planet experience aerodynamic heating. This heating is severe enough to destroy such a vehicle unless some type of protection is provided. A common protective device is a heat shield which undergoes ablation when heated.

The complex surface configurations of some vehicles make it difficult to fabricate and apply the rigid heat shields presently used.

Currently some heat shields are being fabricated by using a honeycomb to reinforce the ablation material. In one approach, the honeycomb is bonded to the structure and each cell individually filled with ablation material. Curing and post curing are performed, the latter at a high temperature which can be detrimental. The shield is then X-rayed and those cells found to have voids are cleaned out and refilled. In addition to the tedious manufacture of such a shield, the performance is not completely satisfactory. During test and in actual flight, the vehicle structure and the shield bonded to it are exposed to temperatures between ±250° F.

Since the coefficients of thermal expansion of the heat shield and the structure it protects differ, cracks not infrequently develop in the shield during thermal cycling. This problem is especially acute in low temperature testing. In such a honeycomb reinforced shield, the honeycomb itself, rather than the ablation material, controls the expansion and contraction of the shield. Since the honeycomb has different coefficients of thermal expansion in its two primary directions, the problem is compounded.

It is, therefore, an object of this invention to provide a heat shield which can be easily applied to complex surfaces.

It is also an object of this invention to provide a heat shield in which the problem of cracking or other failure due to differing coefficients of expansion of shield and vehicle structure is eliminated over a wide range of temperatures.

In a preferred form of invention, a silicone elastomeric material which is flexible is utilized as an ablation material. Resistance to aerodynamic sheer is provided by controlled orientation reinforcement in the form of a discontinuous honeycomb matrix.

The shield is fabricated by selecting a sheet of phenolic honeycomb which is prepared for use by cutting the cell walls a portion of the way through, leaving a sufficient portion of the walls intact to maintain the honeycomb in one piece.

A silicone elastomeric formulation is then mixed and used to fill the honeycomb cells. Curing of the formulation is accomplished at ambient or a slightly elevated temperature such as 120° F. Excess formulation is removed from the side of the honeycomb sheet in which cuts were made. The honeycomb is then sliced perpendicular to the cell walls to remove that layer of the honeycomb which was not cut. The layer which remains is, therefore, held together only by the cured formulation and is flexible due to the elastic nature of this material. A post cure at a higher temperature, say up to about 300° F., is then performed to insure dimensional stability.

The flexible layer or blanket of discontinuous honeycomb reinforced elastomeric material is then cut to conform to the shape of the structure it is to protect. It is secured to the structure by a bond of silicone elastomeric material compatible with the ablation formulation, and the bond is cured at a mildly elevated temperature or allowed to cure at room temperature.

The invention will be better understood from the following description referring to the drawings in which.

Figure 1:
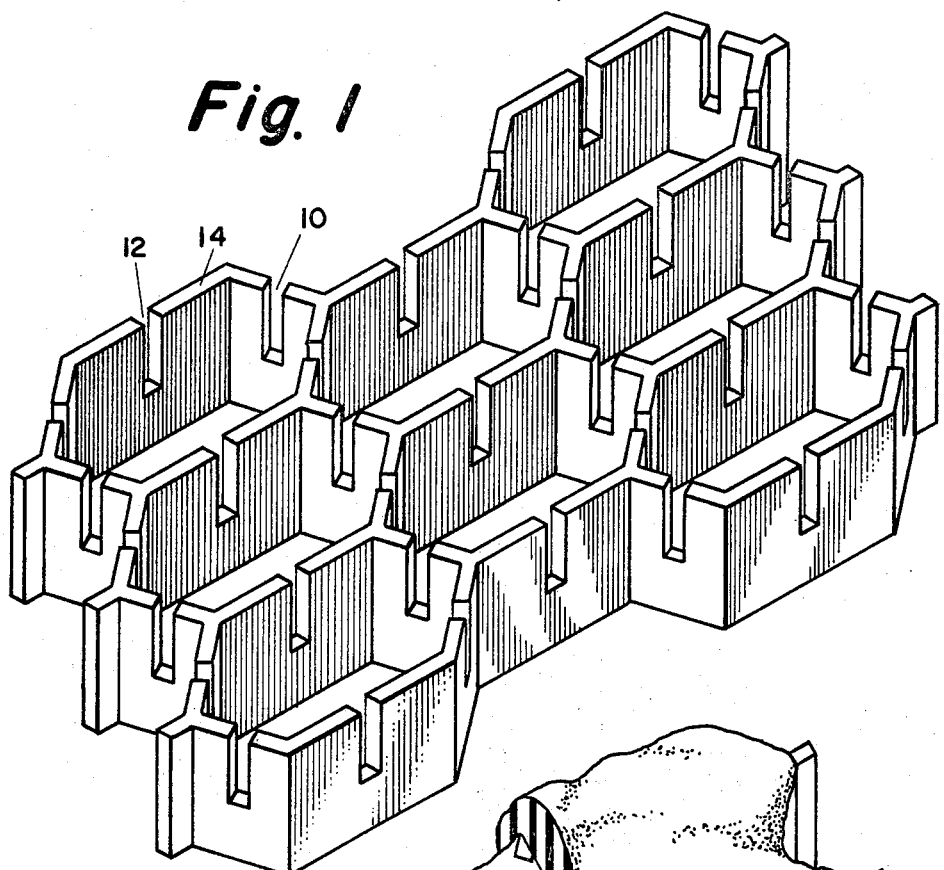
FIGURE 1 is a schematic isometric of a portion of a sheet of honeycomb material prepared for use in the process of this invention.

In FIGURE 1, a section of honeycomb is shown which has been prepared to provide the flexible heat shield of this invention. Cuts, such as 10 and 12, in cell 14, have been made in the walls of each cell. The width of the cuts depends on the size of the honeycomb material used. For example, in a honeycomb having walls of about 0.007 or 0.008 inch thick, cuts from 0.03 to 0.08 inch wide might be made. It will be observed that if the portion of the honeycomb below the level of the cuts were removed, a plurality of discontinuous segments of Y-shaped plan configuration would remain. The honeycomb may be of a variety of materials. As a restriction, materials which are destroyed or weakened rapidly when heated would not be suitable. An asbestos honeycomb has been found satisfactory; however, a phenolic-glass honeycomb available from Hexcell Products, Inc. of Havre De Grace, Md., and identified as HRP–1/4–GF–12–5.5, has been used for the most part.

Having prepared the honeycomb material, which would ordinarily be in large sheets incorporating hundreds of cells instead of the few cells shown in FIGURE 1, an elastomeric material is mixed.

In accordance with the invention, a silicone rubber is used as the basic ingredient in order to provide flexibility to the heat shield. A suitable formulation is prepared as follows: to 100 parts by weight of a liquid silicone rubber compound (RTV 560, available from the Silicone Products Department of General Electric Company, at Waterford, N.Y.) is added 0 to 15 parts of a diluent. Although other silicone fluid diluents may also be used, 96(50), from the same source as the RTV 560, has been found satisfactory. About 10 parts of diluent produces the desired viscosity when fillers are also to be incorporated and/or foaming is to be performed.

From 1 to 35 parts of a filler is then added to complete the basic formulation. Particularly good results have been received from asbestos fibers. These are available from Johns-Manville, Industrial Insulations Division, in Philadelphia. The fibers improve ablation performance by reinforcing the char layer which forms under the heat load.

The density of the shield can also be varied depending upon the performance required. A lower density is achieved through foaming by adding a blowing agent such as RTV 921 to the basic formulation. RTV 921 is available at the Silicone Products Department of General Electric. The thermal insulation properties of the shield are increased by foaming.

It may be desired to cure at room temperature or a temperature mildly elevated from ambient such as 120° F. For this purpose a catalyst such as stannous octuate is added. About 0.5 part of catalyst to 100 parts of the silicone rubber compound is used. This compound is available as Thermolite 12 from M&T Chemicals, Inc. of Rahway, N.J., or as Nucure 28 from the Nuodex Products Division of the Heyden-Newport Chemical Corporation of Elizabeth, N.J. Elevating the temperature also reduces curing time.

To insure adhesion of the elastomeric material to the honeycomb, the honeycomb is first washed and then coated with a primer such as General Electric Company SS4004 or Dow-Corning A4094.

Having mixed the elastomeric material, the honeycomb cells are filled with it. This can be performed by pouring the elastomeric formulation into the cells, or, preferably, placing the formulation in an open topped pan and pushing the honeycomb down into it until it covers the honeycomb.

Curing of the elastomeric material at ambient temperature or at a mildly elevated temperature is then performed.

Figure 2:
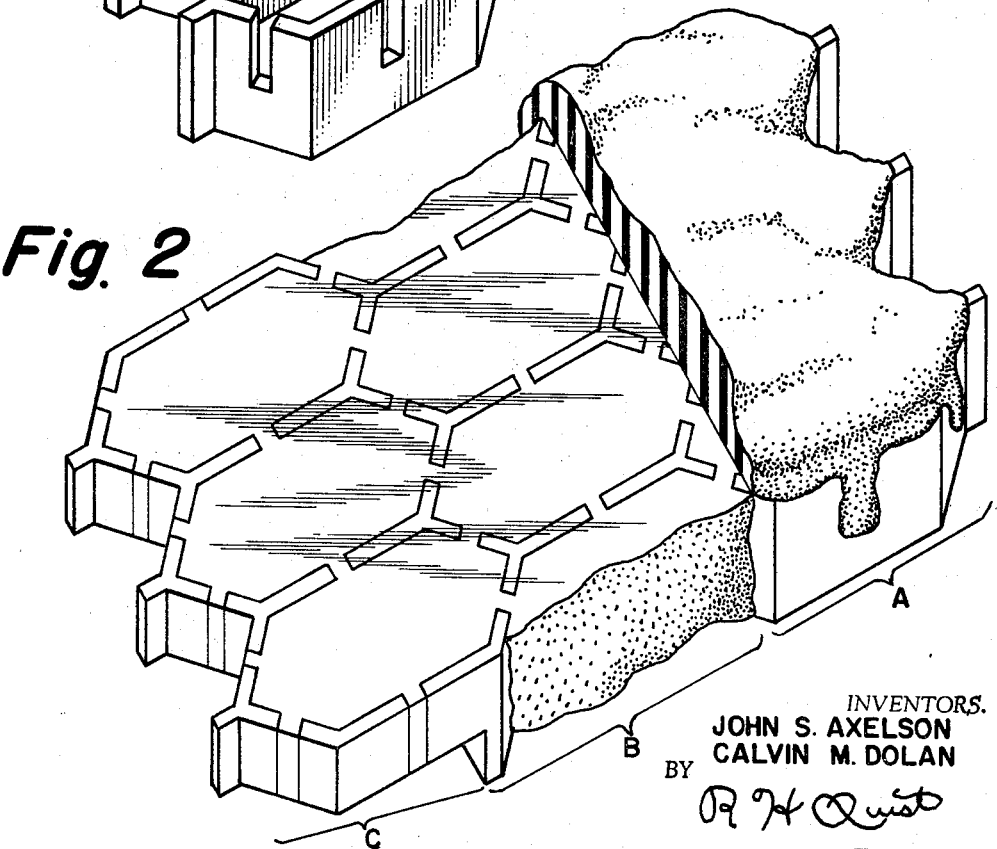
FIGURE 2 is a schematic isometric of the honeycomb of FIGURE 1 in further steps of the process.

After curing has been accomplished, the honeycomb matrix is in the condition indicated in part A of FIGURE 2. The next step in preparation of the heat shield material is removal of excess elastomeric material from the upper surface of the honeycomb. This may be accomplished by cutting or grinding it off. After this step is performed, the honeycomb is in the condition shown in part B of FIGURE 2. The next step involves cutting the honeycomb horizontally at or above the bottom of the cuts in the cell walls. This, as shown in Part C of FIGURE 2, leaves the honeycomb cell walls discontinuous, and held together only by the elastomeric material. Due to the elastic characteristic of the elastomeric material, the resulting product is highly flexible. The thickness of the resulting heat shield can be varied according to the protection required; many have been made 0.5 inch thick, and shields up to 3 inches thick have been fabricated.

A post cure of the heat shield to insure dimensional stability is the final step. This is performed at a temperature of up to a nominal 300° F.

The flexible heat shield of this invention may be applied to a structure by first roughly cutting it to shape. As an example consider a spheroidal structure. In this case the heat shield can be cut as the covering of a baseball or the casing of a basketball.

When the substructure to which the heat shield is to be secured is metal, a primer is first applied to the metal followed by a layer of from 0.005 to 0.015 inch of RTV 560 to which has been added about ½ percent by weight of the T-12 catalyst. The primer used may be General Electric Company SS4004 or Dow-Corning A4094.

If the substructure is plastic, a sealer such as General Electric Company SS4056 is used which is followed by the primer and RTV 560 as for metal substructures.

Those skilled in the art will be aware of alternate materials which can be used to effect a bond. In order to achieve the full advantages of the flexible heat shield, it is desirable to provide flexibility in the bond as well.

The cut heat shield is applied to the bond and trimmed to fit tightly. The bond is cured at ambient or mildly elevated temperature eliminating the danger of damage to the structure it is designed to protect. At this time a grinding tool can be used to smooth the contours. In some instances it is desired to have the shield vary in thickness. Excess material can be removed by grinding to achieve the thicknesses required.

In use, it will be found that the discontinuous honeycomb matrix performs the function of retaining charred ablation material as the unbroken honeycomb does in current shields. The discontinuous nature of the reinforcing matrix of this invention, however, does not limit or control the flexibility of the elastomeric material. Consequently, the shield can expand and contract along with the vehicle structure without fracturing.

While a particular embodiment of a heat shield and process for fabricating it has been illustrated and described, it will be obvious that changes and modifications can be made without departing from the spirit of the invention and the scope of the appended claims.

What is claimed as new and desired to be secured by Letters Patent of the United States is:

1. A flexible heat shield comprising:
   a matrix of honeycomb cells, at least two walls of each of said honeycomb matrix cells being cut through, and
   an ablation material contained in the cells of said honeycomb.

2. A flexible heat shield blanket comprising:
   a matrix of honeycomb cells,
   at least two walls of each of said cells being cut through, and
   a cured silicone elastomeric material contained in said cells.

3. A flexible heat shield blanket comprising:
   a phenolic-glass matrix of honeycomb cells, at least two walls of each of said honeycomb matrix cells being cut through,
   a cured silicone elastomeric material contained in the cells of said honeycomb, and
   said blanket being less than three inches thick.

4. A flexible heat shield blanket comprising:
   a matrix of honeycomb cells,
   the walls of each cell being cut through to form a plurality of reinforcing elements,
   a cured silicone elastomeric material contained in said cells, and
   said blanket being less than three inches thick.

5. The method of preparing a flexible heat shield comprising:
   cutting at least two walls of each cell of a honeycomb sheet down at least a distance equivalent to the thickness of the heat shield required,
   filling the cells of said honeycomb sheet with a silicone elastomeric material,
   curing said silicone elastomeric material,
   removing any excess silicone elastomeric material from the top of said honeycomb sheet, and
   cutting said honeycomb sheet horizontally at the desired thickness.

6. The method of preparing a flexible heat shield comprising:
   cutting each wall of each cell of a honeycomb sheet down at least a distance equivalent to the thickness of the heat shield required leaving intact a portion of the cell wall,
   filling each cell of said honeycomb with a silicone elastomeric material,
   curing said elastomeric material,
   removing any excess elastomeric material from the top of said honeycomb sheet, and
   cutting said honeycomb sheet horizontally at the desired thickness.

7. The method of preparing a flexible heat shield comprising:
   selecting a sheet of honeycomb having a thickness greater than that of the heat shield desired, cutting each wall of each cell of said honeycomb sheet down from one surface a distance at least equivalent to the thickness of the heat shield desired leaving intact a portion of the cell wall,
washing and priming said honeycomb sheet,
filling each cell of said honeycomb with a silicone elastomeric material,
curing said elastomeric material,
removing any excess elastomeric material from said one surface of said honeycomb sheet,
cutting said honeycomb sheet horizontally a distance below said one surface no greater than the depth of the cuts in the cell walls, and
post curing the resulting heat shield.

References Cited

UNITED STATES PATENTS

| | | |
|---|---|---|
| 2,477,852 | 8/1949 | Bacon _____ 161—68 |
| 2,493,032 | 1/1950 | Rheinfrank _____ 161—69 |
| 2,815,795 | 12/1957 | Vander Poel _____ 156—190 |
| 2,999,041 | 9/1961 | Lappala _____ 161—49 |
| 3,043,730 | 7/1962 | Adie _____ 161—123 X |
| 3,078,202 | 2/1963 | Bellanca et al. ____ 161—159 X |
| 3,210,233 | 10/1965 | Kummer et al. _____ 161—68 |

EARL M. BERGERT, *Primary Examiner.*

H. F. EPSTEIN, *Assistant Examiner.*